(12) United States Patent
Vasconcelos

(10) Patent No.: US 8,737,166 B2
(45) Date of Patent: May 27, 2014

(54) ANNIHILATOR BASED WAVE INVERSION

(75) Inventor: Ivan Vasconcelos, Edinburgh (GB)

(73) Assignee: Ion Geophysical Corporation, Houston, TX (US)

( * ) Notice: Subject to any disclaimer, the term of this patent is extended or adjusted under 35 U.S.C. 154(b) by 407 days.

(21) Appl. No.: 12/826,837

(22) Filed: Jun. 30, 2010

(65) Prior Publication Data

US 2011/0122726 A1     May 26, 2011

Related U.S. Application Data

(60) Provisional application No. 61/263,705, filed on Nov. 23, 2009.

(51) Int. Cl.
*G01V 1/28* (2006.01)

(52) U.S. Cl.
CPC ..................................... *G01V 1/282* (2013.01)
USPC .......................................................... 367/73

(58) Field of Classification Search
USPC .................. 367/73; 702/14, 16, 18; 703/5
See application file for complete search history.

(56) References Cited

U.S. PATENT DOCUMENTS

| | | | | |
|---|---|---|---|---|
| 4,982,382 A * | 1/1991 | Dablain | | 367/73 |
| 5,062,086 A * | 10/1991 | Harlan et al. | | 367/73 |
| 6,253,157 B1 * | 6/2001 | Krebs | | 367/73 |
| 7,345,951 B2 * | 3/2008 | Broto et al. | | 702/18 |
| 8,120,991 B2 * | 2/2012 | Koren et al. | | 702/16 |

OTHER PUBLICATIONS

Vasconcelos, et al., "Wave-equation extended images via image-domain interferometry," SEG Houston 2009 International Exposition and Annual Meeting, pp. 2839-2843.
Sava, et al., "Efficient computation of extended images by wavefield-based migration," SEG Houston 2009 International Exposition and Annual Meeting, pp. 2824-2828.
International Search Report and Written Opinion for PCT Application No. PCT/US2010/057659 dated Jan. 26, 2012, 11 pages.
Maarten V. De Hoop et al., "Wave-equation reflection tomography: annihilators and sensitivity kernels." Geophysical Journal International. vol. 167, No. 3, Dec. 1, 2006, pp. 1332-1352.
Christiaan C. Stolk et al., "Seismic inverse scattering in the downward continuation approach." Wave Motion, vol. 43, No. 7, Aug. 1, 2006, pp. 579-598.
William W. Symes, "Migration velocity analysis and waveform inversion." Geophysical Prospecting, vol. 56, No. 6, Nov. 1, 2008, pp. 765-790.
Paul Sava et al. "Efficient computation of extended images by wavefield-based migration." SEG Expanded Abstracts, vol. 28, Oct. 25, 2009, pp. 2824-2828.
Ivan Vasconcelos et al., "Wave-equation extended images via image-domain interferometry." SEG Extended Abstracts, vol. 28, Oct. 25, 2009, pp. 2839-2843.
EPO Examination Report dated Jun. 25, 2013, EPC Application No. 10784403.7-1559, 5 pages.

(Continued)

*Primary Examiner* — Ian J Lobo
(74) *Attorney, Agent, or Firm* — Dorsey & Whitney LLP

(57) ABSTRACT

A method for verifying the accuracy of a wave velocity model. The method may include generating an extended image using the wave velocity model, operating on the extended image using an annihilator, where the extended images represent a geophysical field, and determining if the extended image obeys at least one physical characteristic. In the event that the extended image does not obey at least one physical characteristic the method may include recreating or altering the wave velocity model accordingly.

22 Claims, 8 Drawing Sheets

(56) References Cited

OTHER PUBLICATIONS

Duchkov, Anton A, et al., "Migration velocity analysis using wave packets—geometric approach", SEG Extended Abstracts, Houston 2009 International Exposition and Annual Meeting, XP055013719, Oct. 25, 2009, pp. 3999-4003.

Sava, Paul et al., "Extended imaging conditions for wave-equation migration", Geophysical Prospecting, vol. 50, No. 1, XP055013726, Jun. 7, 2010, pp. 35-55.

Van Leeuwen, T et al., "A comparison of seismic velocity inversion methods for layered acoustics", Inverse Problems, vol. 26, No. 1, XP020167557, Dec. 17, 2009, 15008 (21pp).

Williamson, Paul et al., "Full wave-equation methods for complex imaging challenges", The Leading Edge, vol. 29, No. 3, XP001551831, Mar. 1, 2010, pp. 264-268.

Vasconcelos, Ivan et al., ION Geophysical Corporation, "Image-domain wave-equation tomography—strategies, examples, & role in model building," Presentation given during SEG Workshop entitled "Full wave-equation methods for complex imaging challenges," Oct. 30, 2009.

\* cited by examiner

ANNIHILATOR BASED WAVE INVERSION

CROSS-REFERENCE TO RELATED APPLICATIONS

This application claims priority to Provisional U.S. Patent Application Ser. No. 61/263,705 titled "Wave Equation Imaging", which was filed on Nov. 23, 2009.

BACKGROUND

I. Technical Field

The present invention relates generally to geophysical exploration systems and more particularly to data acquisition in geophysical exploration systems.

II. Background Discussion

Petrochemical products, such as oil and gas, are ubiquitous in society and can be found in everything from gasoline to children's toys. Because of this, the demand for oil and gas remains high. In order to meet this high demand, it is important to locate oil and gas reserves in the Earth. Scientists and engineers utilize, among other things, seismic and other wave exploration survey techniques to find oil and gas deposits within the Earth. These seismic exploration techniques often include controlling the emission of seismic energy into the Earth with a seismic source of energy (e.g., dynamite, air guns, and/or vibrators), and monitoring the Earth's response to the seismic source with a receiver (e.g., a geophone, a hydrophone, etc.). By observing the reflected seismic signals detected by the receiver during the survey, geophysical data pertaining to reflected signals may be acquired and these signals may indicate the composition of the Earth proximate to the survey location.

One concern with the current methods of processing seismic imaging data is reliability. Data used to determine a drilling location, is recorded and a model is developed, based on the data recorded. The data may then be used to predict and illustrate the underground structure. For example, where a reservoir might be located or other details of the subsurface structure. Incorrect data causes companies to lose money in labor and equipment costs, as well as opportunity costs. For example, a company following incorrect data may drill in the wrong area and lose time that could have been spent drilling in the correct area. Data reliability is especially important in instances where there are complicated geological structures in the subsurface. However, these complicated geological structures create large problems for imaging. This is because the speed of sound varies significantly in complicated structures. For example, if the variation of wave speed occurs very quickly laterally, then the model for predicting the data may be inaccurate.

Accordingly, methods and apparatuses are needed to provide more accurate modeling and data for determining subsurface structures.

SUMMARY

Embodiments of a method for verifying the accuracy of a wave velocity model are disclosed. The method may include generating an extended image using the wave velocity model and operating on the extended image using an annihilator. The extended image may be operated on by an annihilator as the extended image may represent a geophysical field, and then, the method may include determining if the extended image obeys at least one physical characteristic. In the event that the extended image does not obey at least one physical characteristic the method may include recreating or altering the wave velocity model accordingly.

Other embodiments may include a method for creating a wave velocity model for surface and subsurface modeling. The method may include creating a starting velocity model, producing at least one extended image via the starting velocity model, applying at least one annihilator to the at least one extended image, and then reviewing the at least one extended image after being operated on by the at least one annihilator to verify if the at least one extended image obeys at least one physical principle.

Still other embodiments may include a tangible storage medium having instructions capable of being executed by a computer system. The instructions may include the operations of computing a wave velocity model based on data gathered from a subsurface, generating at least one extended image using the wave velocity model, and operating on the at least one extended image using the at least one annihilator.

BRIEF DESCRIPTION OF THE DRAWINGS

The use of the same reference numerals in different drawings indicates similar or identical items.

DETAILED DESCRIPTION OF THE INVENTION

Figure 1A:
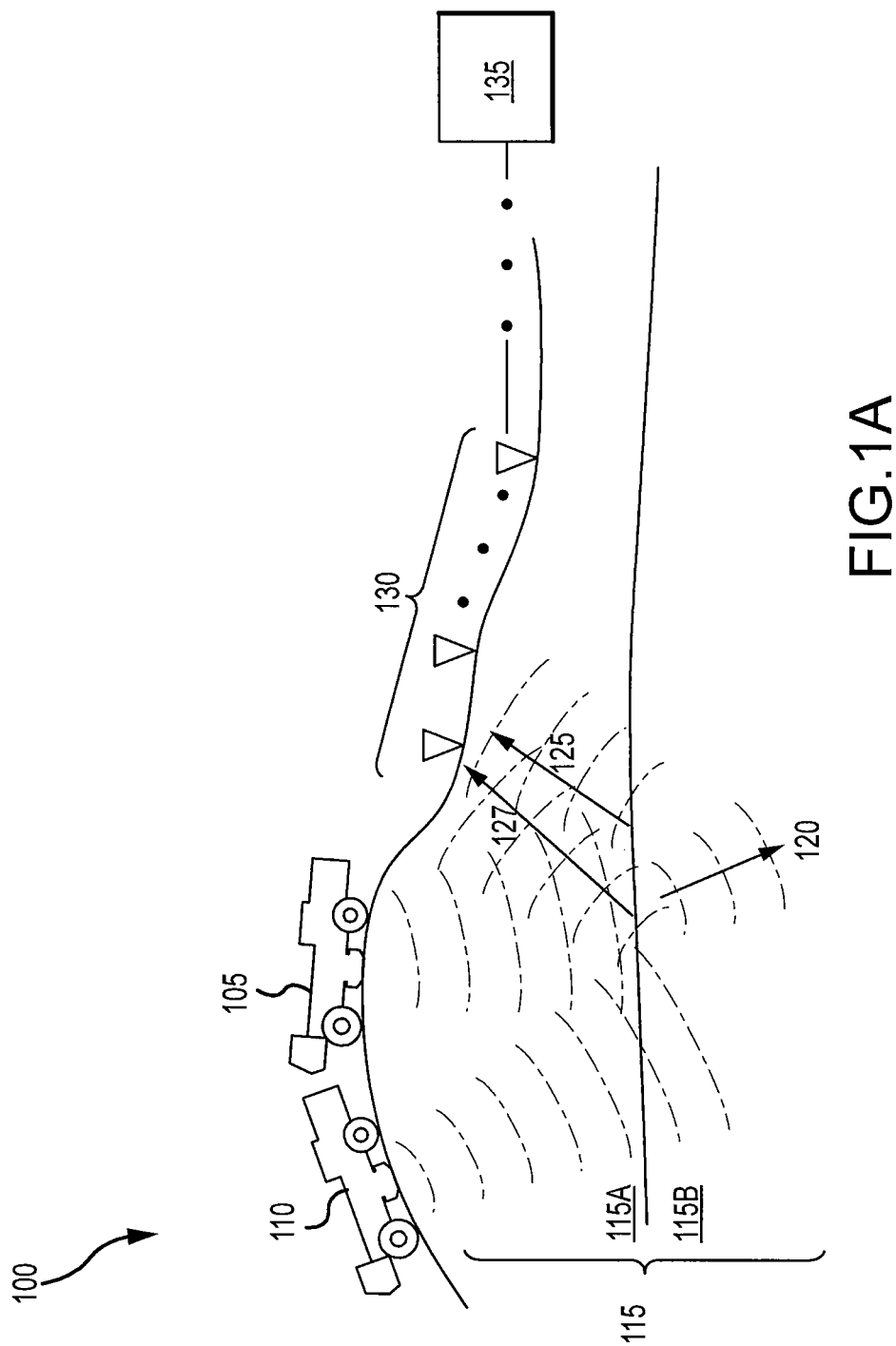
FIG. 1A illustrates a seismic acquisition system used in oil and gas exploration.

Wave imaging for data systems is disclosed that allow for accurate mapping of the Earth's subsurface in three dimensions. Some embodiments include methods for determining a more accurate subsurface model using a plurality of "extended" images. Each extended image in the plurality is related by physical principles such as different depth, lateral location, time or a combination of different depths, lateral locations and time. These extended images provide subsurface reconstruction for a variety of subsurface geometries and at a varieties of times, not just at time equal to zero. Data produced from the extended images may be formatted and analyzed to ensure that it obeys physical principles. In some embodiments, the extended images are analyzed using "light cones" that apply laws of physics, such as the principle of causality, to the extended images in order to determine the data points that are physically acceptable. In these embodiments, the light cones act as annihilators for the extended images. In other embodiments other relationships may be used, such as partial differential equations, to annihilate the extended images. Any number of extended images may be annihilated—resulting in a more accurate subsurface model, as each extended image provides another level of sensitivity and accuracy, to the model. It is also possible to rely on a subset of extended-image locations and/or image extensions to perform inversions using this method. The annihilated extended images may be used to recursively evaluate the model to determine the accuracy of the model. If the model is inaccurate, it may be revised and then reevaluated—using the annihilation process.

One skilled in the art will understand that the following description has broad application. For example, while embodiments disclosed herein may focus on wave equation modeling for subsurfaces based on seismic sound sources, it should be appreciated that the concepts disclosed herein equally apply to other systems using non-seismic sources such as magnetic, electrical, and/or electromagnetic sources, to name but a few. Furthermore, while embodiments disclosed herein may focus on land based acquisition systems, the concepts disclosed herein may equally apply to non-land based acquisition systems, such as marine based acquisition systems utilizing contemporaneous marine sources. Additionally, the embodiments disclosed herein may be used for any land based acquisition system and any subsurface acquisition system, such as a vertical seismic profile (VSP). For instance, the embodiments disclosed may be used to analyze data for surface and subsurface seismic data, as well as elastic and viscoelastic data. Also, for the sake of discussion, the embodiments disclosed herein may tend to focus on oil and gas exploration; however, these concepts apply to geophysical exploration in general, including applications outside the oil and gas exploration context. Accordingly, the discussion of any embodiment is meant only to be exemplary and is not intended to suggest that the scope of the disclosure, including the claims, is limited to these embodiments.

FIG. 1A illustrates a seismic acquisition system 100 used in oil and gas exploration. The seismic acquisition system 100 may include a plurality of seismic sources 105 and 110 configured to impart shock waves of seismic energy into a formation 115. These seismic sources 105 and 110 may include vibrators with a large mass placed in contact with the formation 115, where the large mass is struck against the formation 115 to impart seismic energy. In some embodiments, the seismic sources 105 and 110 may include an XVib® tracked chassis vibrator and/or an AHV-IV™ tire-based vibrator both of which are available from Ion Geophysical, Inc. of Houston, Tex. Additionally, the sources 105, 110 may be any other apparatus capable of producing ground-penetrating sound waves, such as dynamite, air guns or the like. Furthermore, as these embodiments may be used with marine acquisition sources, microseismic earthquakes, and the like may be also be used as the sources 105, 110.

During operation, the sources 105 and 110 may impart seismic energy or sound waves, into the formation 115 as shown generally in FIG. 1A. The formation 115 may include regions with varying geophysical properties, such as strata 115A and 115B. The seismic energy imparted into the formation 115 may travel through the various strata 115A and 115B, and because of their varying geophysical properties, the strata 115A and 115B may react differently to the imparted seismic energy. For example, at the boundary between the strata 115A and 115B, a certain amount of seismic energy from the source 105 may be absorbed by the strata 115B and continue to travel through the strata 115B. This is indicated in FIG. 1A with an arrow 120 indicating a general direction that the transmitted seismic energy may travel. In addition to the transmitted energy 120 continuing to travel through the strata 115B, a certain amount of seismic energy may be reflected back from the junction of the strata 115A and 115B. This is indicated in FIG. 1A with an arrow 125 indicating a general direction that the reflected seismic energy may travel.

The reflected seismic energy 125 may be measured by an array of seismic receivers 130. The receivers 130 may transmit these seismic measurements, either wirelessly or via a wire line (not specifically shown in FIG. 1A) back to a computer system 135. In some embodiments, the receivers 130 may include a Firefly® system of wireless geophones available from Ion Geophysical, Inc. of Houston, Tex. In other embodiments, the receivers 130 may include a Scorpion® system of wire line geophones available from Ion Geophysical, Inc. of Houston, Tex. and/or an Aries II® system of wire line sensors available from ARAM Systems Ltd., of Calgary, Canada.

The computer system 135 may include one or more computer systems executing seismic processing software. In some embodiments, the computer system 135 may include what is termed a "dog house," which is a computer system remotely located in the field along with the receivers 130. Other embodiments may include the computer system 135 that is in a different location than the receivers 130 such that the computer system 135 receives seismic data remotely.

Figure 1B:
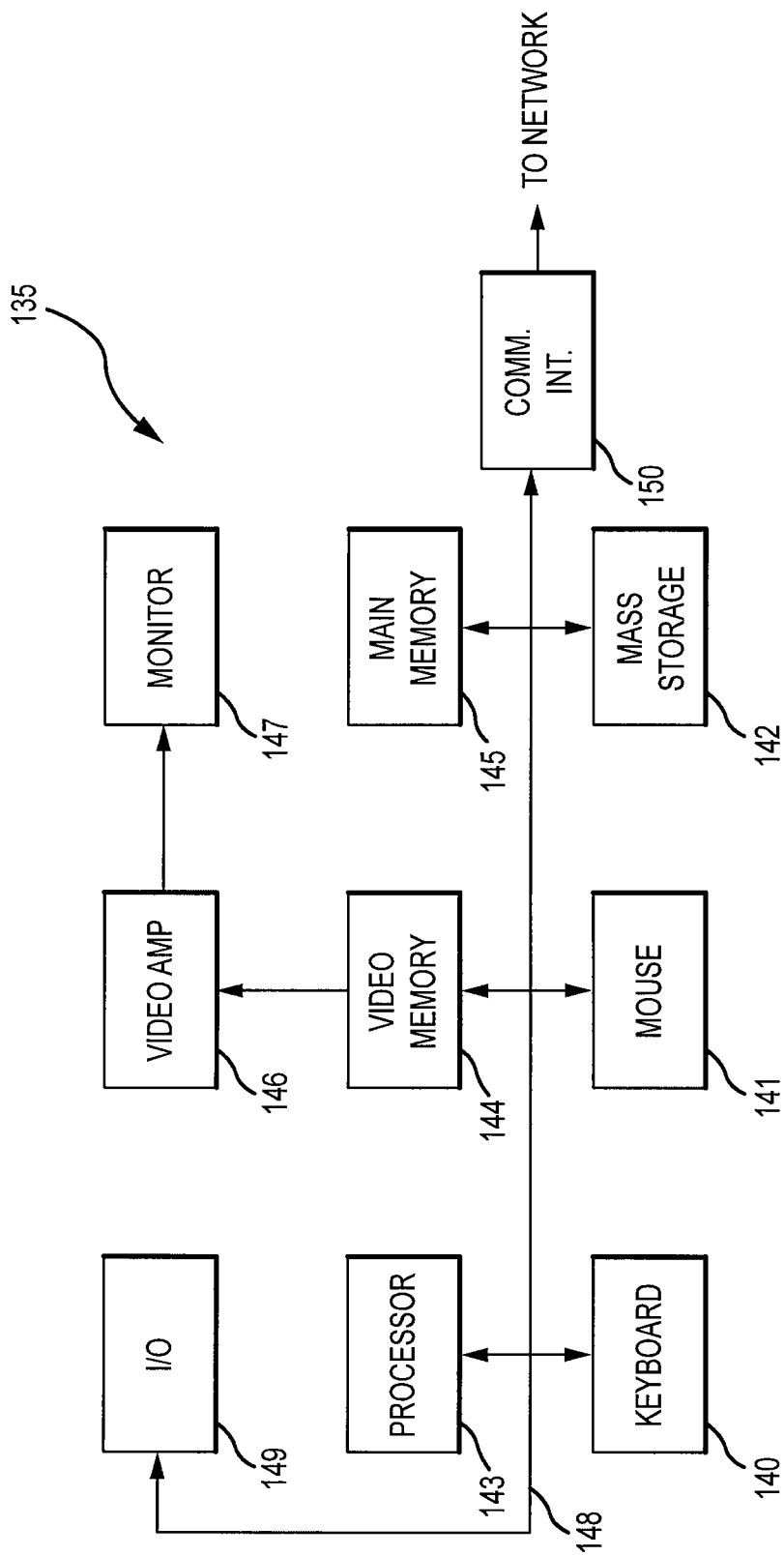
FIG. 1B illustrates an example of the computer system shown in FIG. 1A.

FIG. 1B illustrates an embodiment of the computer system 135 capable of storing and/or processing signals, such as to produce images modeling and representing the seismic and waveform signals. In some embodiments, the computer system 135 may be an implementation of enterprise level computers, such as one or more blade-type servers within an enterprise. In other embodiments, the computer system 135 may be a personal computer and/or a handheld electronic device. A keyboard 140 and mouse 141 may be coupled to the computer system 135 via a system bus 148. The keyboard 140 and the mouse 141, in one example, may introduce user input to the computer system 135 and communicate that user input to a processor 143. Other suitable input devices may be used in addition to, or in place of, the mouse 141 and the keyboard 140. An input/output unit 149 (I/O) coupled to the system bus 148 represents such I/O elements as a printer, audio/video (A/V) I/O, etc.

Computer 135 also may include a video memory 144, a main memory 145 and a mass storage 142, all coupled to the system bus 148 along with the keyboard 140, the mouse 141 and the processor 143. The mass storage 142 may include both fixed and removable media, such as magnetic, optical or magnetic optical storage systems and any other available mass storage technology. The bus 148 may contain, for example, address lines for addressing the video memory 144 or the main memory 145.

The system bus 148 also may include a data bus for transferring data between and among the components, such as the processor 143, the main memory 145, the video memory 144 and the mass storage 142. The video memory 144 may be a dual-ported video random access memory. One port of the video memory 144, in one example, is coupled to a video amplifier 146, which is used to drive a monitor 147. The monitor 147 may be any type of monitor suitable for displaying graphic images, such as a cathode ray tube monitor (CRT), flat panel, or liquid crystal display (LCD) monitor or any other suitable data presentation device.

The computer system includes a processor 143, which may be any suitable microprocessor or microcomputer. The computer system 135 also may include a communication interface 150 coupled to the bus 148. The communication interface 150 provides a two-way data communication coupling via a network link. For example, the communication interface 150 may be a satellite link, a local area network (LAN) card, a cable modem, and/or wireless interface. In any such implementation, the communication interface 150 sends and receives electrical, electromagnetic or optical signals that carry digital data streams representing various types of information, such as seismic signals that have been separated from a blended signal and/or blended signals.

Code received by the computer system 135 may be executed by the processor 143 as the code is received, and/or stored in the mass storage 142, or other non-volatile storage for later execution. In this manner, the computer system 135 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

Regardless of the actual implementation of the computer system 135, the data processing system may execute operations that allow for the processing and analysis of multiple waveform and seismic signals.

Figure 2:
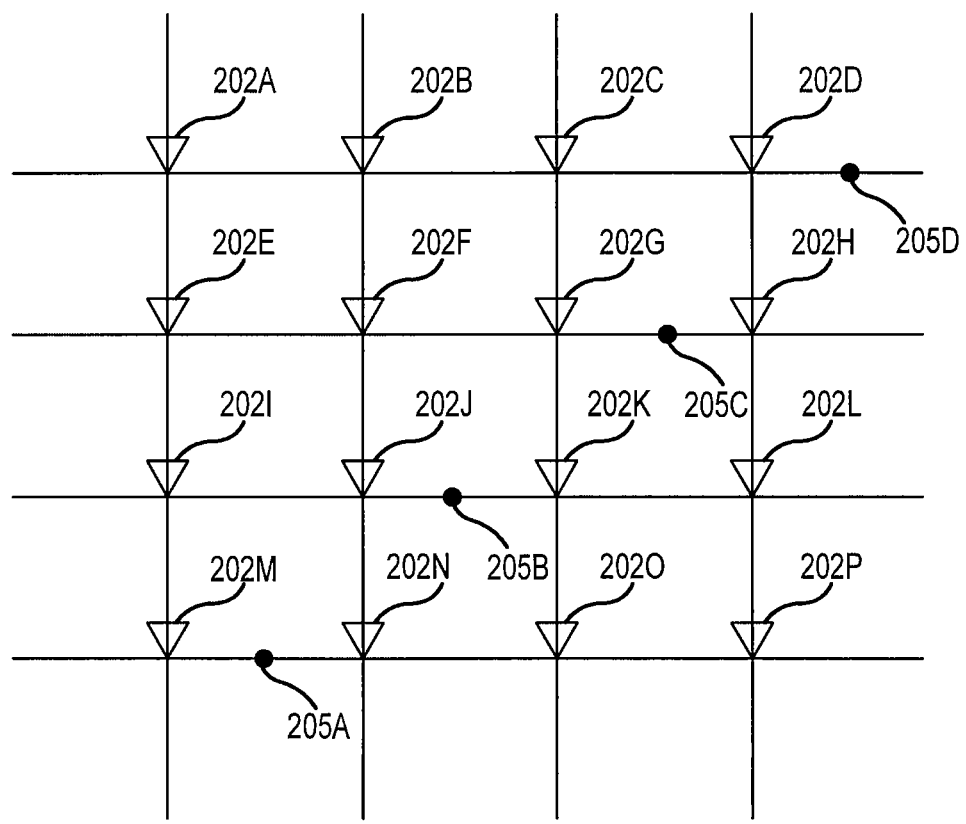
FIG. 2 illustrates a top down view of an array of receivers and a plurality of sources.

FIG. 2 illustrates a top down view of an array of receivers 202A-P and a plurality of seismic sound sources 205A-D. The receivers 202A-P and sources 205A-D are illustrated in a grid arrangement (i.e., orthogonal to each other), for the sake of discussion. However, depending upon the embodiment, the receivers 202A-P may be arranged in a variety of configurations as the techniques and embodiments disclosed are not restricted to any particular geometric configuration. Also, while a certain number of receivers 202A-P and/or sources 205A-D are shown in FIG. 2, the number employed may vary according to the particular embodiment. For example, in some embodiments, the use of 8 seismic sound sources is believed to provide a desired balance between signal-to-noise ratio considerations versus burdening the computation resources of the computer system 135 (shown in FIGS. 1A and 1B).

Once the computer system 135 receives the data from the receivers 202A-P, a "velocity model" may be developed that predicts the speed of sound in the formation 115. In particular, and referring momentarily back to FIG. 1A in conjunction with FIGS. 1B and 2, the velocity model predicts the changes in the speed of sound in the formation 115 as the seismic sound energy emanates across boundaries in the various strata 115A and 115B. Comparing the strata 115A and the strata 115B for example, there may be different sized rock in the strata 115A versus the strata 115B, and therefore, the speed of the sound energy and its accompanying velocity model may be different in these the two strata 115A and 115B. The starting velocity model is a direct representation of subsurface properties (i.e. it has units of wave speed, conductivity, etc.). Based upon the velocity model, the computer system 135 may create an image of the formation 115 that allows scientists and engineers to have a better picture of the subsurface, and thereby permit them to locate oil and gas deposits in the formation 115.

In order to develop a starting velocity model, the data collected by the receivers 202A-P are generally used to estimate a wave-speed equation model for the formation 115. This starting velocity model may be developed using migration velocity analysis, such as ray theory based or wave equation based methods. Because of the high contrast between the boundaries of the strata 115A and 115B, seismic energy waves reflect off this boundary. This is shown in FIG. 1A as arrows 125 and 127. As a result of the seismic energy being reflected off the boundary, the receivers 202A-P may perceive this as abrupt changes in the speed of the seismic energy waves, and images may be formed by the computer 135 based upon these abrupt changes in the speed of sound. In some embodiments, the process of creating images based upon velocity modeling is referred to as "forward modeling".

Figure 3A:
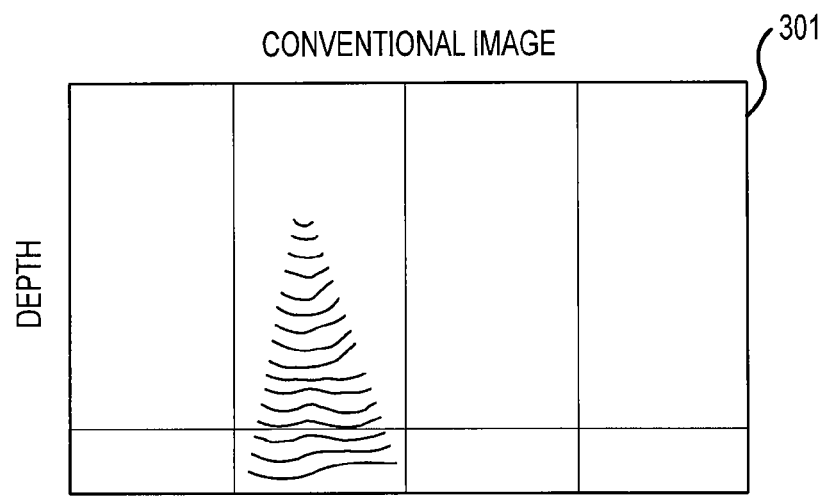
FIG. 3A illustrates an example of a conventional image created using a starting velocity model.
Figure 3B:
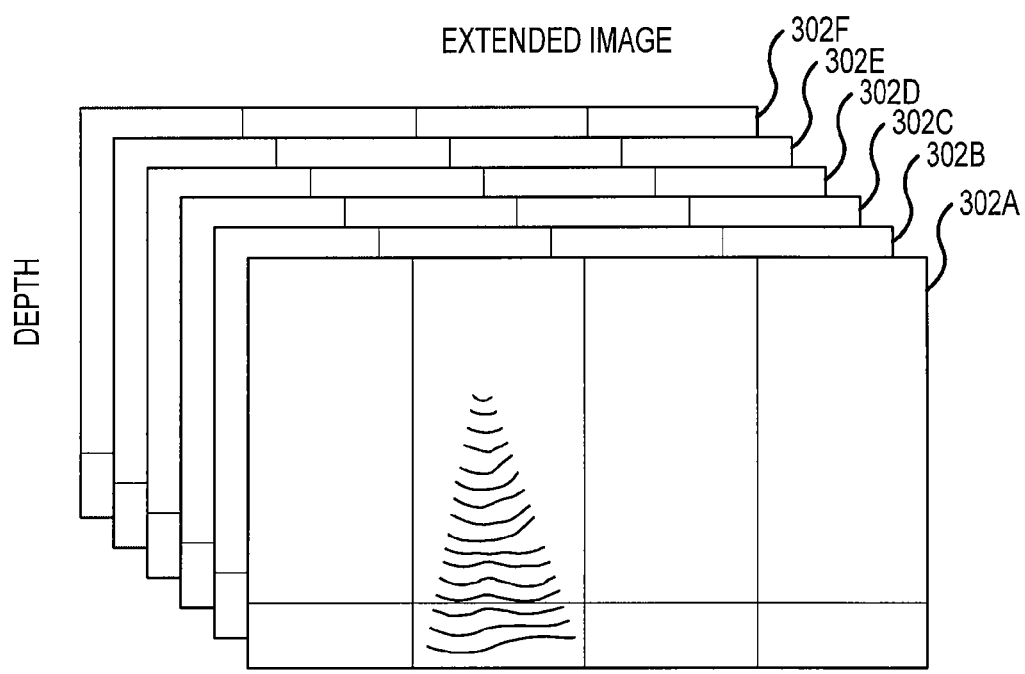
FIG. 3B illustrates an example of extended images created using a starting velocity model.
Figure 4:
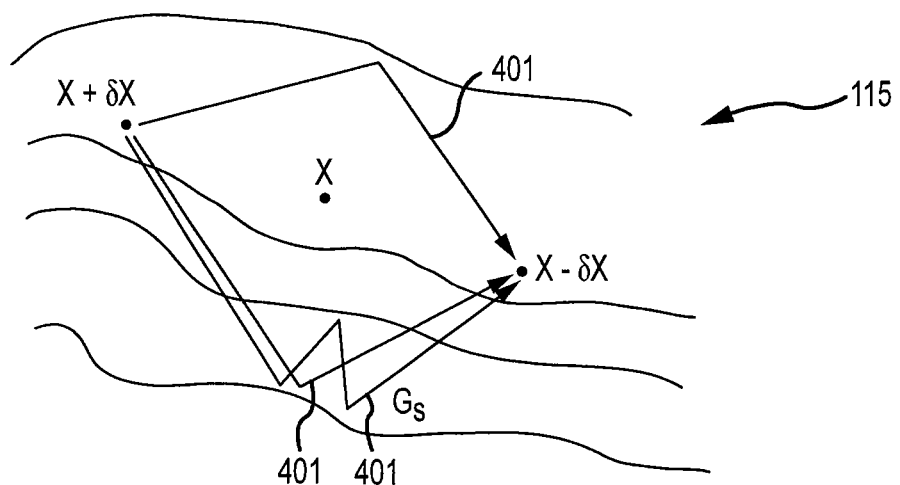
FIG. 4 is an illustration of points used to determine an extended image within a rock formation.

Once the starting velocity model has been developed, based on the data collected via receivers 207A-207P, a number of images may be produced. The images represent the sound waves, which are functions of the speed of sound in the subsurface as well as the abrupt changes in the speed of sound in the subsurface. FIGS. 3A and 3B illustrate the variety of images that may be produced by the starting velocity model. FIG. 3A illustrates a conventional image 301 and FIG. 3B illustrates a set of extended images 302A-302F, each of which may be produced via the starting velocity model. The images developed may represent a geophysical field, for example, pressure, displacement, or an electric field within the subsurface, using model-based redatuming, which translates the positions of the seismic sources and/or receivers. Model-based redatuming operates on the data and can account for translations of positions of the sources/receivers or both sources and receivers. Redatuming may help improve the model results in instances where there may be irregular topography or the like. Based on the data collected and the starting velocity model of the formations, the images may reconstruct fields inside the surface where direct observations may be difficult if not impossible.

The method steps for producing both types of images is discussed below. The conventional image 301 illustrated in FIG. 3A may be produced by Eq. (1) below. In general, the conventional image 301 corresponds to zero-offset, zero-time subsurface scattered waves, essentially the conventional image 301 is a snap-shot of waves at a time and location not equal to zero. Eq. (1) produces the data-domain objective function, which may be used to create an image-domain function (e.g. Eq. (2)).

$$\mathscr{J}_d(m) = \frac{1}{2} \| d^{obs} - \mathscr{F}_d(m) \|^2 \qquad \text{Eq. (1)}$$

Referring to Eq. (1), $d^{obs}$ represents the observed data (i.e. the data collected via the receivers 202A-P), m represents the unknown model, $\mathscr{F}_d(m)$ is the modeling operator that maps functions in the model space M to data in data space D, i.e. $\mathscr{F}_d: M \mapsto D$. The term $d^{obs}$ may be any wave field or transport quantities, for instance, elastic attenuative wave, electro-magnetic fields, concentration of pore fluids, or the like. Because of this, $\mathscr{F}_d$ generally corresponds to a partial differential equation where m is a spatially varying physical coefficient, such as tensor, conductivity, transport coefficients and the like.

Eq. (2) represents an alternative to the data-domain objective function illustrated in Eq. (1). Eq. (2) is an image-domain misfit function, as opposed to the data-domain objective function illustrated in Eq. (1). The difference between Eq. (1) and Eq. (2) is that Eq. (1) is in the surface-data domain and therefore directly relying on surface-acquired, observed data, whereas Eq. (2) is the image domain and represents the geophysical field reconstructed inside the subsurface.

$$\mathscr{J}_I(m) = \frac{1}{2}\|I^{obs} - \mathscr{F}_I(m; d)\|^2 \qquad \text{Eq. (2)}$$

As was mentioned previously, the model may be known or may be otherwise estimated (e.g., using inversion), and is a direct representation of the subsurface properties, whereas an image is a reconstruction of the inside of the subsurface. Eq. (1) illustrates the relationship between the observed data, the modeling operator and the actual model (i.e. the direct representation of the subsurface properties). Eq. (2) on the other hand illustrates the relationship between the image, the model and the data. Referring to Eq. (2), the term $I^{obs}$ represents an image depending on both d and m, where the image is created by the modeling operator $\mathscr{F}_I$, that maps the model parameters directly onto images, i.e. $\mathscr{F}_I: M \mapsto I$, where I is the function space of images. Eq. (2) allows the image, e.g. conventional image 301, to be considered as input data to the model and the image may then be modeled directly from the starting velocity model. The operator $\mathscr{F}_I$ in Eq. (2) may increase in model sensitivity with respect to $\mathscr{F}_d$. This may be because of the relationship illustrated in Eq. (3), below.

$$I = \mathscr{F}_I(m; d) = \mathscr{F}_I(m; \mathscr{F}_d(m)) \qquad \text{Eq. (3)}$$

As discussed above with respect to Eq. (2), $I^{obs}$ represents the observed image. This observed image $I^{obs}$ may then be defined in the context of time-lapse inversion, i.e. data changes over time. Eq. (4) illustrates Eq. (2) where $I^{obs}$ is defined with respect to data changes over time. The observed image may be produced from the data collected and processed via the starting velocity model.

$$\mathscr{J}_{\delta d}(\delta m) = \frac{1}{2}\|\delta d^{obs} - \mathscr{F}_{\delta d}(\delta m; m_0, d_0)\|^2 \qquad \text{Eq. (4)}$$

Referring to Eq. (4), $\delta d^{obs}$ represents the changes in the observed data over a changing period of time, i.e. time-lapse, and may be determined by subtracting the observed baseline data (data at time equal to zero) from a posterior observation (data observed at some other period of time). The data model operator $\mathscr{F}_{\delta d}$ in Eq. (4) models the change in field quantities based on a change of coefficients in a partial differential equation representing the subsurface. Applying the above principles along with relationship between the operator $\mathscr{F}_I$ and model sensitivity (as shown in Eq. (3)), Eq. (5) may be derived, representing an image-domain objective function.

$$\mathscr{J}_{\delta I}(\delta m) = \frac{1}{2}\|\delta I^{obs} - \mathscr{F}_{\delta I}(\delta m; m_0, \delta d, d_0)\|^2 \qquad \text{Eq. (5)}$$

In Eq. (5) the observed image change is represented by $\delta I^{obs}$ may be obtained by subtracting the image of the baseline data from that of a repeat survey (i.e. second set of data), this is shown in Eq. (6) below. In Eq. (6) both images are generated using the baseline model, i.e. the starting velocity model, represented by $m_C$. Also, it may be assumed that there is a change in subsurface parameters, but that the location of any discontinuities within the subsurface remain the same. Based on this assumption, $\mathscr{F}_{\delta I}$ can be illustrated by Eq. (7), and the model operator for the changes in the image $\mathscr{F}_{\delta I}$ may be dependent upon the model parameters as well as the data modeling operators $\mathscr{F}_d$ and $\mathscr{F}_{\delta d}$, as shown in Eq. (8).

$$\delta I^{obs} = \mathscr{F}_I(m_0; d^{obs}) - \mathscr{F}_I(m_0; d_0^{obs}) \qquad \text{Eq. (6)}$$

$$\mathscr{F}_{\delta I} = \mathscr{F}_I(m_0; d_0 + \delta d) - \mathscr{F}_I(m_0; d_0) \qquad \text{Eq. (7)}$$

$$\mathscr{F}_{\delta I} = \mathscr{F}_{\delta I}(\mathscr{F}_{\delta d}(\delta m; m_0, \mathscr{F}_d(m_0)); m_0) \qquad \text{Eq. (8)}$$

Using Eq. (8) and Eq. (5) the time-lapse inversion may be used to create image and model extensions, as shown in Eq. (9) below.

$$\mathscr{J}_{\delta I_e}(\delta m) = \frac{1}{2}\|\delta I_e^{obs} - \hat{\mathscr{F}}_{\delta I}(\delta m; m_0, \delta d, d_0)\|^2 \qquad \text{Eq. (9)}$$

Referring to Eq. (9), the image may now be considered to be an extended image $I_e$, and $I_e^{obs}$ represents the observed extended images, i.e. those produced from the data collected. In Eq. (9), the model operator is now represented $\hat{\mathscr{F}}_{\delta I}$, by which is the extended images operator. The extended images operator $\hat{\mathscr{F}}_{\delta I}$ may be used to map an extended model space $M \times M_e$ onto the extended image space $I \times I_e$. This may be used to produce the extended images, as shown in FIG. 3B. The extended images that may be produced, for example 302A-302F, may represent waves as if there are multiple receivers around a source, and each receiver is viewed at finite travel times, i.e. at times not equal to zero. Therefore, the extended images 302A-302F that may be defined may represent multiple dimensions, for example, depth, lateral location, source location and time. These dimensions may be useful in gauging the depletion of oil and/or gas deposits in the formation 115 over time, for instance over periods of production. The extended images produced by Eq. (9) may differ from conventional images, such as image 301, in that conventional images may be offset only in the lateral direction, whereas extended images 302A-302F may be offset in either the lateral or depth directions. Additional detail on extended images may be found in Vasconcelos, I., Sava, P. C., Douma, H., 2010, "Nonlinear extended images via image-domain interferometry", Geophysics, submitted for publication, which is incorporated by reference as if full set forth below. The extended images 302A-302F produced represent geophysical fields that may not have actually been measured, in other words the extended images 302A-302F may reconstruct a geophysical field.

Although the observed extended images have been defined, a best-fit model is estimated based on the observed data $d^{obs}$ and the starting velocity model $m_C$. This means that $I_e^{obs}$ in Eq. (9) may represent the true extended image, which would be produced using the correct/true model. However, the true image, $\delta I_e^{true}$ is not known, but by using an annihilator, Eq. (9) may be manipulated into Eq. (10) below. An annihilator $\mathscr{A}$ is an operator that results in a null vector when applied to an image produced from data evaluated using a model that best fits with that data. Using the annihilator, the extended image $\tilde{I}_e(m_0; d^{obs})$ may be estimated from the observed data and the starting velocity model. Eq. (10) may not share assumptions about the model (e.g. that the model interface does not change), as does its time-lapse counterpart, Eq. (5).

$$\mathscr{J}_{\mathscr{A} I_e}(\delta m) = \frac{1}{2}\|\mathscr{A} I_e(m_0; d^{obs}) - \mathscr{A} \hat{\mathscr{F}}_{\delta I}(\delta m; m_0)\|^2 \qquad \text{Eq. (10)}$$

In order to define the annihilator $\mathscr{A}$ used in Eq. (10), the observed extended image $I_e$ may be defined as Eq. (11) below. Referring to Eq. (11), the image-domain scattered field (represented by term $G_S$) generally includes multiple image points. Additionally, the term x represents a point in the extended image, δx represents a space-lag extension (i.e. a location offset from the original x location), and τ represents time-lag extensions (i.e. a time offset from time equal to zero).

$$I_e(x, \delta x, \tau) = G_s(x+\delta x, x, \tau) \qquad \text{Eq. (11)}$$

As illustrated by Eq. (11), the extended images 302A-302F produced may be related through a function of the starting velocity model. In some embodiments, each extended image 302A-302F may depend on each other extended image 302A-302F through a function of the model. This may be because Eq. (11) can produce extended images for a variety of times, locations and depths. Using Eq. (11) and assuming ideal conditions, the extended image $I_e$ satisfies a partial differential equation for the scattered field. As a result, the extended images 302A-302F may be the geophysical field. The appreciation that the extended images may represent a field allows for a variety of annihilators that are not possible with conventional approaches.

Eq. (11) generally defines the extended image $I_e$ as a time and space dependent object. This relationship between the extended image and the partial differential equation is represent by Eq. (12) below.

$$L(m_0, \delta m)I_e = -V(m_0, \delta m)G_0 \qquad \text{Eq. (12)}$$

Referring to Eq. (12), the physical behavior of extended images that can be defined by Eq. (11) are shown. The term $L(m_0, \delta m)$ in Eq. (12) is a differential operator depending on subsurface properties of formation 115. The L operator can be used as an operator for acoustic or elastic waves, electromagnetic fields, and the like. The term $V(m_0, \delta m)$ in Eq. (12) represents the scattering potential corresponding to the extended image $I_e$ and the differential operator L. The scattering potential $V(m_0, \delta m)$ is a differential operator that may be directly proportional to the desired medium change δm. The term $G_0$ in Eq. (12) represents the Green's tensor from the starting velocity model $m_c$. Inc Green's tensor is a combination of vector objects, where the vector objects are elements of Green's functions (i.e. impulse response) for different combinations of both sensor and source components of vector/tensor fields (e.g. elastic and electromagnetic waves).

Using Eq. (12) and Eq. (11), extended images may be created representing the actual geophysical field using the model. The extended images 302A-302F may increase the sensitivity to the subsurface model, additionally the extended images 302A-302F increase the accuracy of a model created versus a conventional image 301. The accuracy may be increased as each extended image adds redundant yet independent information to the inverse problem. The operations for applying extended images to correct the starting velocity model are discussed below with respect to FIGS. 6-7. Additionally, as the dimensions of extended images 302A-302F used to check the starting velocity model increase, the more sensitive the extended images 302A-302F will become to the model parameters. However, in order for each extended image 302A-302F to increase the sensitivity, the information represented by each extended image 302A-302F is generally offset by at least one variable. For example, each extended image 302A-302F may be offset from each other by either time, lateral location, depth or wave source location. The more changes illustrated in each extended image 302A-302F, the more the sensitivity may be increased.

After the extended images 302A-302F have been produced using the starting velocity model, the extended images 302A-302F may be used to verify the accuracy of the starting velocity model. The finite frequency effects of waves, together with practical limitations in field-data acquisition, in the formation 115 may make it difficult for the starting velocity model to be mathematically accurate. Therefore, there may be a need to correct and/or alter the starting velocity model. The extended images 302A-302F may be used to check the model in a finite frequency setting. For example, the first extended image 302A and the second extended image 302B may be used to update the model via inversion, and using both the extended images 302A and 302B it is possible to re-engineer the model. For instance, if an incorrect starting velocity model $m_c$ is used, the resulting images may result in physically impossible/inadmissible behavior. These operations are discussed in more detail below in regard to FIGS. 6 and 7.

In order to determine if the behavior is physically possible an annihilator may be used. The annihilator $\mathscr{A}$ for an extended image may be defined using Eq. (13) below. Referring to Eq. (13), the term $\delta m_{trial}$ represents a trial model, in other words a model that is being tested to determine if it is a correct representation of the subsurface or the sample model.

$$\mathscr{A}I_e = L(m_0, \delta m_{trial})I_e + V(m_0, \delta m_{trial})G_0 \qquad \text{Eq. (13)}$$

Eq. (13) may be used to define an annihilator $\mathscr{A}$ when the data collected is substantially error-free, and under ideal conditions for acquisitions geometry (i.e. full and dense source and receiver coverage completely surrounding/enclosing the target, acquisition of dual fields, and the like). In many instances the result produced by Eq. (13) may be off due to data collection errors, errors induced via acquisition geometry limitations, inaccurate/inappropriate back-propagation routines and other similar problems. Furthermore, even if the starting velocity model (or other model being tested) is the correct model, there may not be enough data to satisfy Eq. (13). For instance, there may be artifacts, such as illumination gaps leading to missing subsurface data of aliased portions of extended images, spurious nonphysical signals in the extended-image space, and the like, that prevent Eq. (13) from being satisfied properly (i.e. preventing Eq. (13) from equaling zero). Also, in practical cases where there may be finite data (e.g. limited acquisition geometries or limited available measurements) Eq. (13) may not be as useful. However, in some instances Eq. (13) may be the preferred equation, such as where measurements from inside the well in addition to measurements on the surface are combined (e.g. a walk away 3D vertical seismic profile (VSP)).

When applying Eq. (13) to the image, if Eq. (13) does not equal zero, there are two potential reasons for this discrepancy, either the velocity model is not correct or there is not enough data (or error-free data) to allow Eq. (13) to be satisfied. However, if Eq. (13) is equal to zero, then the velocity model is correct and the extended image produced from that model is correct, when the extended image is defined by Eq. (11) and Eq. (12). Additionally, in some embodiments Eq. (13) may be used to update the model using recursive methods.

Because Eq. (13), in some instances, may not be preferable, Eq. (14) below may be used to define the annihilator $\mathscr{A}$ more accurately. Eq. (14) imposes physical properties, such as causality and semblance, on the $L(m_0, \delta m)$ operator in Eq. (12). Generally Eq. (14) states that when the L operator is referring to wave propagation, then fields satisfying Eq. (11) above must obey causality or semblance.

$$\mathscr{A}_{cone}^{out}(\delta x, \tau) = \begin{cases} 0, & \text{if } [\delta x, \tau] \text{ is in lightcone} \\ w(\delta x, \tau; m_0), & \text{if } [\delta x, \tau] \text{ out of lightcone} \end{cases} \quad \text{Eq. (14)}$$

Figure 5:
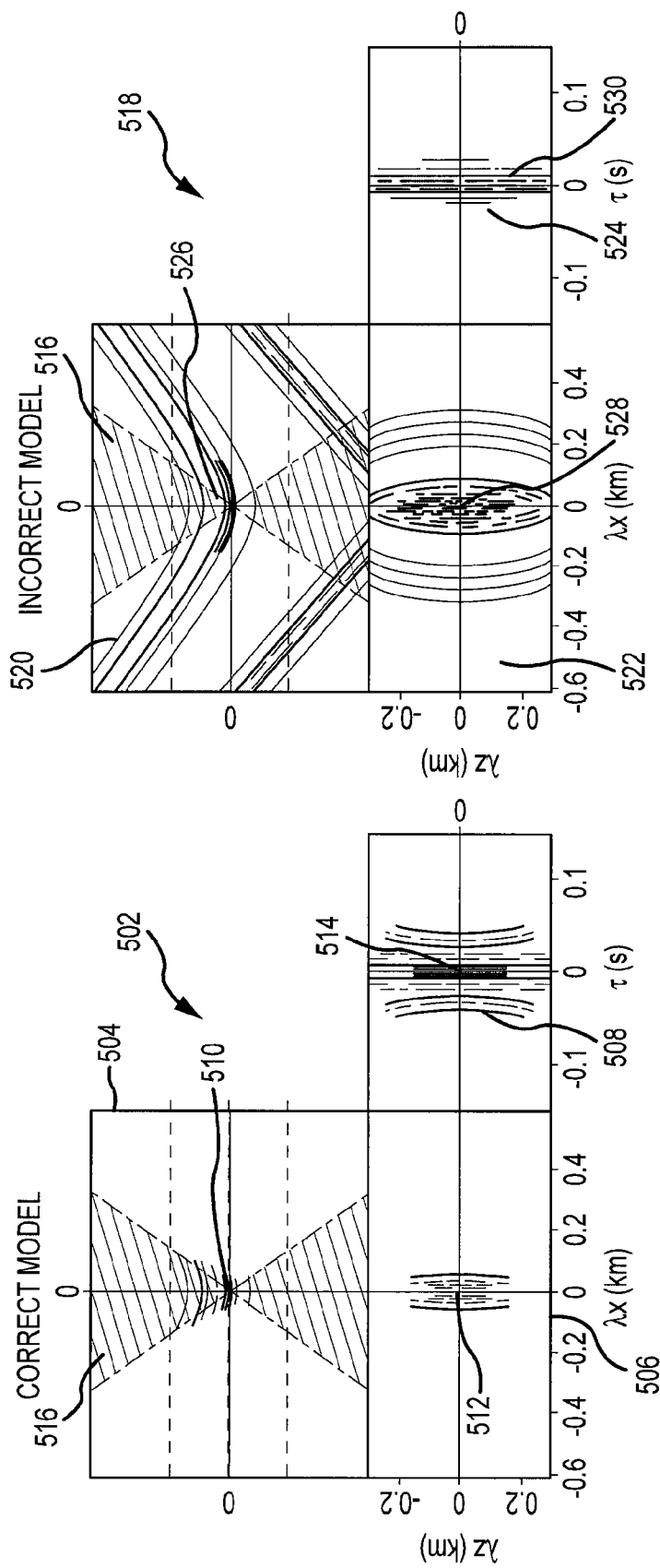
FIG. 5 is an illustration of light cones applied to extended images in an incorrect and a correct starting velocity model.

FIG. 5 illustrates sample extended images produced by a correct velocity model 502 as well as extended images produced by an incorrect velocity model 518. The top extended image 504, 520 for both the incorrect and correct models represents the echo (or wave response) recorded at a time and location equal to zero. Using Eq. (14), the principle of wave causality states generally that no signal arrives before the first arrival predicted according the model parameters. In some embodiments, this concept may be used in combination with the extended images to verify that the model obeys physical laws. For example, as shown in the top panel 504 of the correct model, the response is centered around the origin, versus the top panel 520 in the incorrect model in which an echo is illustrated at distances away from zero. The response shown in the top panel 520 is incorrect because it does not obey causality. This is because the speed of sound underground is finite, and therefore, the echo of the source may not be received at receivers at time equal to zero (other than those receivers located at the scattering source), thus any echo illustrated away from the origin violates causality and is not physically possible. In order to apply the causality principle to the panels a light cone 516 defined by Eq. (14) may be applied to each extended image 302A-302F.

As shown in FIG. 5, the light cone 516, as defined by Eq. (14) is applied to the top panels 504, 520 in both the incorrect and correct velocity models. In the correct model top panel 504, the only image 510 is located at the origin, and thus obeys causality. In the incorrect velocity model top panel 520, the image 526 is shown at other areas besides the origin. In this top panel 520, the image 526 indicates that at time equal to zero, the source was recorded by receivers located at a distance away from the source—which is not physically possible and/or does not obey the principle of causality. Therefore, in analyzing the top panel 520 of the incorrect model, it may be understood that the model is incorrect as it is producing sample extended images that show wave properties that are not physically possible. Similarly, in analyzing the correct model 502 top panel 504, the image 510 only exists at the origin, which is physically possible.

In these embodiments, the light cone 516, as defined by Eq. (14) may act as an annihilator for each extended image 302A-302F, or as illustrated in FIG. 5, the top panels 504, 520.

Using physical principles Eq. (14) applies the concept of a light cone to describe the domain of wave fields that can contain non-zero physical principles. As discussed above with respect to FIG. 5, the annihilator defined by Eq. (14) annihilates the energy of the extended images in the area corresponding to physical arrivals (i.e. waves) that are predicated using the starting velocity model and weights any unphysical energy (i.e. those waves in the extended image that are not physically possible) outside the light cone or causality zone. The causality zone or the light cone in some embodiments may not be a "cone" and the shape depends on the geometry of the wave propagating surface. In the presence of smooth background models, where the constant-wave speed cones may not be appropriate, the first-arrival time deformed light cone may be predicted using conventional ray-tracing or wavefront-tracing methods. However, in embodiments where the surface may be constant or very smooth, the light cone may be conical, and Eq. (15) may be used to define the annihilator $\mathscr{A}$. For example, if the sound speed at a small affinity of the extend image is roughly constant Eq. (15) may be used in conjunction with or instead of Eq. (14), and the previous discussion of Eq. (14) should be understood to encompass Eq. (15).

$$\mathscr{A}_{cone}^{out}(\delta x, \tau) = \begin{cases} 0, & \text{if } |\delta x| < |\tau|c_0 \\ |\delta x| - |\tau|c_0, & \text{if } |\delta x| \geq |\tau|c_0 \end{cases} \quad \text{Eq. (15)}$$

In some instances Eq. (14) and/or Eq. (15) may not annihilate some un-physical behavior that may be present within the light cone area. Information or data points that fall within the light cone may be neglected by Eqs. (14) and/or (15), in these instance the annihilator may be defined by Eq. (16) below. In these embodiments the light cone 516 may be other shapes as Eq. (16) operates on the interior of the causality zone or light cone, whereas Eq. (14) and/or Eq. (15) operate generally on the outside of the light cone. In some embodiments, Eq. (16) may be used to check shunt waves, and other areas outside of the light cone or coverage by Eq. (14) and/or (15).

$$\mathscr{A}_{cone}^{in}(\delta x, \tau) = \begin{cases} \mathscr{S}_{DSO}[\mathscr{E}_{NMO}[I_e]], & \text{if } [\delta x, \tau] \text{ is in lightcone} \\ 0, & \text{if } [\delta x, \tau] \text{ out of lightcone} \end{cases} \quad \text{Eq. (16)}$$

Referring to Eq. (16), $\mathscr{E}_{NMO}[I_e]$ represents the NMO-corrected extended image using the available model coefficients, and the term $\mathscr{S}_{DSO}$ is a differential semblance operator measuring the flatness of events within the extended image light cone area. Eqs. (14), (15) and (16) are specific examples of Eq. (13), and Eq. (13) is the general case. However, as discussed above, Eq. (13) may produce an desirable result in a limited number of instances. It should be noted, that the above equations (in particular Eqs. (13)-(16)) may be used for any surface acquisition system, including any variety of configuration and may be used for both surface and subsurface imaging. These methods may also be used for imaging/inversions based on a sparse, regular or otherwise, selection of extended-image locations or extensions.

Figure 6:
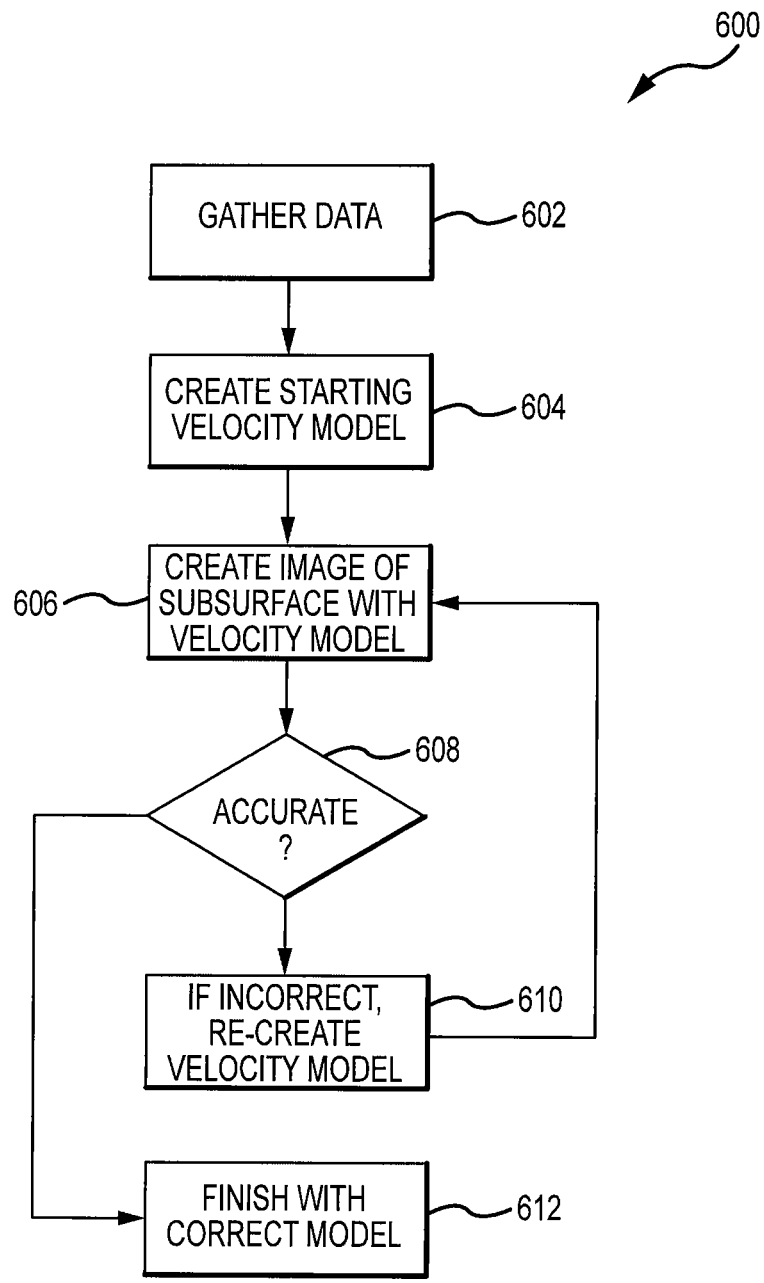
FIG. 6 is a flow chart demonstrating operations for creating an accurate subsurface velocity model.

FIG. 6 is a flow chart illustrating operations 600 improving the accuracy of subsurface images by annihilating extended images. Operations 600 may begin with operation 602 gathering data. The data may be gathered with the operations discussed above with regard to FIGS. 1A-2, or any other gathering data operation. Once the appropriate data has been gathered, operation 604 may be used to create a starting velocity model. The starting velocity model may assume a constant background, for example a constant speed of sound within the subsurface, or any other type of initial estimate of velocity. In some instances the initial model may be a model where the sound speed is assumed to equal approximately 500-1500 meters per second. Operation 606 then may be used to create an image of the subsurface using the velocity model. The image created may be a plurality of extended images 302A-F. In some embodiments, each extended image 302A-F within the plurality may correspond to each data point measured at each lateral and depth location.

Once an image has been created, operation 608 verifies the accuracy of the model. The accuracy may be verified using via the method illustrated in FIG. 7, which is described in greater detail below. After the accuracy of model has been checked in operation 608, next in operation 610, the starting velocity model may be modified based upon the annihilation of the plurality of extended images 302A-302F—i.e., each extended image that is incorrect may be used to recursively correct the starting velocity model. In the event that the starting velocity model is incorrect (e.g., at least some of the extended images in the plurality do not obey physical principles), then control may flow to operation 606 where the image of the subsurface velocity model may be recalculated and subsequent operations (608-610) may be repeated to re-check the accuracy of the model. In the event that the current velocity model is correct, then control may flow to operation 612 to indicate that it is accurate.

Figure 7:
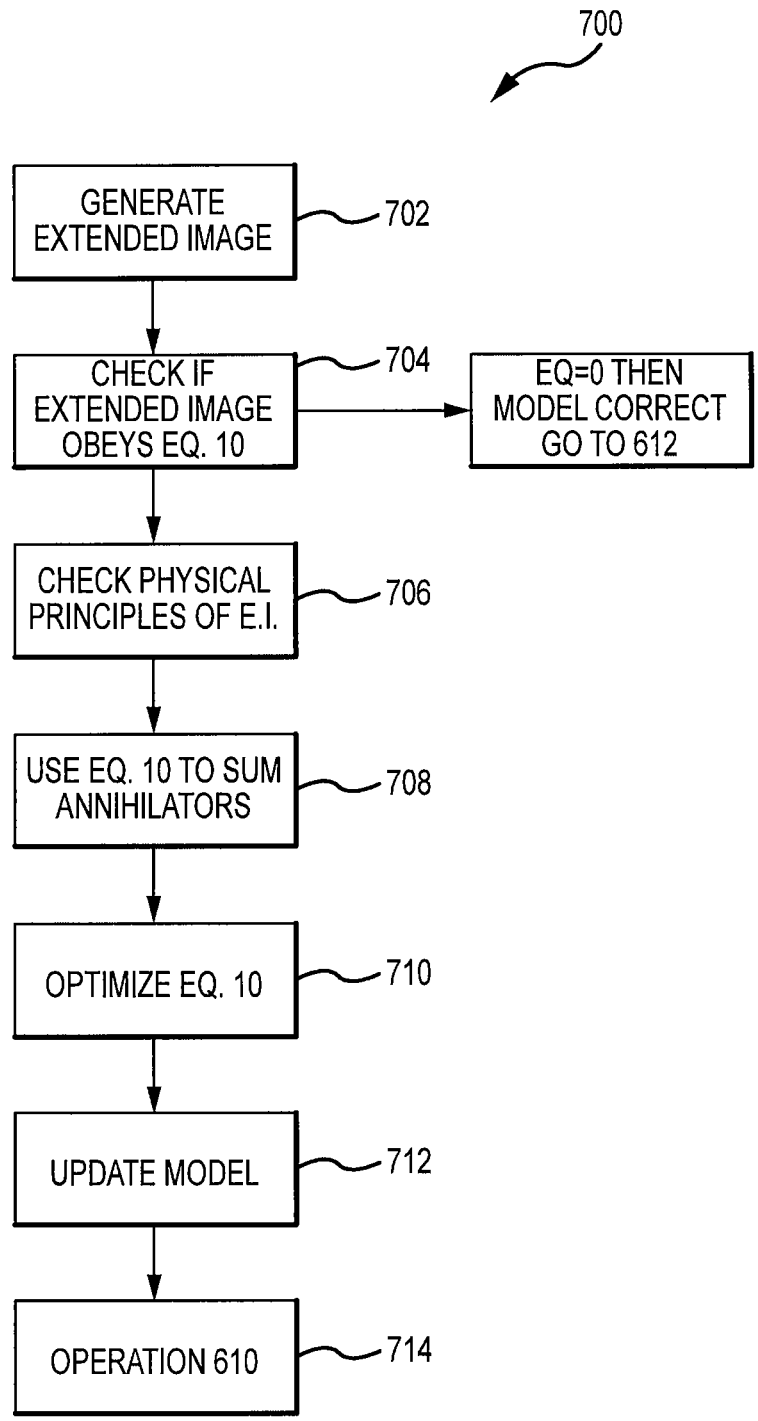
FIG. 7 is a flow chart demonstrating operations for verifying the accuracy of the starting velocity model.

FIG. 7 is a flow chart illustrating operation 608 in FIG. 6 in greater detail, operation 608 verifies the accuracy of the model. Operations 700 may begin with operation 702 generating an extended image. In this operation 702 the extended image may be generated via Eq. (9) above. The extended image generated may be, for example, extended images 302A-302F. Operation 704 may check the extended image generated to determine if the extended image satisfies Eq. (13), this may be done by assuming that the extended image is equal to a field and as such obeys Eq. (13) above. If Eq. (13) zeroes out, the operations may flow to operation 612, which indicates the model is correct because the extended image satisfies physical principles. However, if Eq. (13) does not zero out, there are two possibilities, the artifacts (discussed above) and/or data errors are preventing Eq. (13) from zeroing out or the incorrect model is being used.

Operation 706 verifies whether the extended images produced obey physical principles helping to determine whether it is the model or data errors that are causing Eq. (13) not to zero out. Operation 706 multiplies the extended image by Eq. (14), Eq. (15) or Eq. (16) either alone or in combination. Eq. (14), (15) and (16) check the physical principles illustrated in the extended images to determine whether the energy illustrated in the image is physical. Next, in operation 708, Eq. (10) may be used to determine if the result from either Eq. (14), (15) or (16) may be summed with the result from Eq. (14), (15) or (16). For instance, in some embodiments two different annihilators may be produced via operation 706, i.e. one annihilator produced by Eq. (14) and one annihilator produced by Eq. (15). In these embodiments the annihilators produced by each equation may be substituted in Eq. (10), and the two norms produced via Eq. (10) may be summed together. The norms produced may be explicit, well-defined mathematical distances or measures between an acceptable results (i.e. an annihilated extended image equating to zeroes) and one that is not acceptable (i.e. an annihilated extended image that does not equate to zero). The choice of the norm may correspond to evaluating different, complementary criteria for quantifying the inaccuracy of a currently available model, relative to a given set of images.

In operation 710 Eq. (10) is optimized. This operation 710 may be done via either direct or iterative optimization. In some embodiments, a conjugate gradient method may be used as an iterative optimization method, and in some embodiments a matrix-based least-squared inverse direct optimization method may be used. Using the optimization produced via operation 710, in operation 712 the model may then be updated for δm using the new information. The result of operation 712 is the desired model, and recreates the model in operation 610 in FIG. 6.

What is claimed is:

1. A method for verifying the accuracy of a wave velocity model, comprising the acts of:
    generating an extended image in a computing machine with at least one processor using the wave velocity model, the extended image representing a reconstructed geophysical wavefield within a subsurface with both space-lag extensions and time-lag extensions;
    operating on the extended image using an annihilator, the annihilator acting to annihilate energy in the extended image that corresponds to physically possible arrival's and to weight energy corresponding to physically impossible arrivals;
    determining if the extended image obeys at least one physical characteristic; and
    in the event that the extended image does not obey at least one physical characteristic, recreating the wave velocity model.

2. The method of claim 1, further comprising the act of equating the extended image with a partial differential equation defining a scattered field represented by the wave velocity model.

3. The method of claim 2, wherein the partial differential equation of the most general form is $L(m_0, \delta m)I_e = -V(m_0, \delta m)G_0$, wherein $I_e$ is the extended image, L is a differential operator, V is a scattering potential, $\delta m$ is a desired medium change, $m_0$ is a starting velocity model, and $G_0$ is Green's tensor from the starting velocity model $m_0$.

4. The method of claim 1 wherein the wave velocity model models a ground subsurface.

5. The method of claim 1, wherein the wave velocity model models a ground surface.

6. The method of claim 1 at least one physical characteristic causality.

7. The method f claim 1, wherein the at least one physical characteristic is semblance.

8. The method of claim 1, wherein the annihilator is a light cone and zeroes an energy represented by the extended image within the light cone corresponding to wave arrivals predicted using the wave velocity model and weights any energy represented by the extended imago outside of the light cone.

9. The method of claim 1, further comprising the act of gathering data from the geophysical field.

10. The method of claim 1, wherein the annihilator is a first annihilator and further comprising the acts of:
    operating on the extended image with a second annihilator; and
    summing a result of operating on the extended image with the first annihilator with a result of operating on the extended image with the second annihilator.

11. The method of claim 10, further comprising optimizing an objective function responsive to summing the result of operating on the extended image with the first annihilator with the result of operating on the extended image with the second annihilator.

12. The method of claim 1, wherein the space-lag extensions are in both the lateral and depth directions.

13. A method for creating a wave velocity model for surface and subsurface modeling comprising the acts of:
    creating a starting velocity model:
    producing at least one extended image in a computing machine with at least one processor via the starting velocity model, the at least one extended image representing a reconstructed geophysical wavefield within a subsurface with both space-lag extensions and time-lag extensions;
    applying at least one annihilator to the at least one extended image, the annihilator acting to annihilate energy in the extended image that corresponds to physically possible arrivals and to weight energy corresponding to physically impossible arrivals; and reviewing the at least one extended image after being operated on by the at least on annihilator to verify if the at least one extended image obeys at least one physical principle.

14. The method of claim 13, further comprising the act of altering the starting velocity model if the at least one extended imago does not obey at least one physical principle.

15. The method of claim 13, further comprising the acts of:
equating the at least one extended image with a field equation defined by the starting velocity model; and
defining the at least one annihilator as a light cone.

16. method of claim 13, further comprising the act of gathering data, wherein the data is used to create the starting velocity model.

17. The method of claim 13, wherein the at least one annihilator is defined by $\mathscr{A} I_e = L(m_0, \delta m_{trial})I_e + V(m_0, \delta m_{trial})G_0$, wherein A is the at least one annihilator, $I_e$ is the extended image, L is a differential operator, v is a scattering potential, $\delta m_{trial}$ is a trial model, $m_0$ is the starting velocity model, and $G_0$ is Green's tensor from the starting velocity model $m_0$.

18. The method of claim 13, wherein the at least one physical principle is either causality or semblance.

19. A tangible storage medium comprising instructions capable of being executed by a computer system, the instructions comprising the operations of:
computing a wave velocity model based on data gathered from a subsurface area
generating at least one extended image using the wave velocity model, the at least one extended image representing a reconstructed geophysical wavefield with within the subsurface area both space-lag extensions and time-lag extensions; and
operating on the at least one extended image using at least one annihilator, the annihilator acting to annihilate energy in the extended image that corresponds to physically possible arrivals and to weight energy corresponding to physically impossible arrivals.

20. The tangible storage medium of claim 19, further comprising defining the at least one annihilator as a light cone.

21. The tangible storage medium of claim 19, further comprising determining if the at least one extended image obeys at least one physical characteristic.

22. The tangible storage medium of claim 21, wherein the at least one physical characteristic is causality.

* * * * *